United States Patent [19]

Brantley

[11] 3,929,448
[45] Dec. 30, 1975

[54] METHOD FOR ENHANCING THE LIFE OF CUT FLOWERS

[76] Inventor: Richard K. Brantley, 706 Cheltenham Road, Wilmington, Del. 19808

[22] Filed: July 5, 1974

[21] Appl. No.: 486,018

[52] U.S. Cl. ............................ 71/68; 71/86; 71/94
[51] Int. Cl.² ........................................ A01N 3/02
[58] Field of Search ..................................... 71/68

[56] References Cited
UNITED STATES PATENTS

| | | | |
|---|---|---|---|
| 2,805,137 | 9/1957 | Clopton | 71/68 |
| 3,122,432 | 2/1964 | Biggs | 71/68 |
| 3,846,512 | 11/1974 | Largsdorf | 71/76 |

*Primary Examiner*—Glennon H. Hollrah

[57] ABSTRACT

Disclosed is a method for preserving a cut flower which involves contacting the cut flower with an aqueous solution containing an effective amount of a carbamoylphosphonate compound. Particularly preferred are ammonium ethyl carbamoylphosphonate and ammonium methyl carbamoylphosphonate. The composition for practicing the invention also includes embodiments wherein the aqueous solution contains a nutrient sugar, a systemic fungicide and various bacteriostats. The method is particularly effective in preserving and enhancing the beauty of cut flowers such as roses, chrysanthemums, carnations, snapdragons and gladioli.

21 Claims, No Drawings

METHOD FOR ENHANCING THE LIFE OF CUT FLOWERS

BACKGROUND OF THE INVENTION

A considerable amount of research effort has been expended in the pursuit of methods to prolong the storage and vase life of cut flowers. This has resulted in numerous publications and patents. Typical of such efforts are the disclosures found in New York State Flower Grower Bulletin No. 224 (1964) or U.S. Pat. No. 3,328,157 dated June 27, 1967, to Darpinian. Many of these materials are effective in prolonging the vase life of flowers beyond that of simply placing the cut end of flowers in water. Generally, the more effective of the useful materials of the prior art methods are believed to be based on a solution of a nutrient, usually a sugar, a bacteriostat such as 8-hydroxyquinoline and perhaps some heavy metal salt and, in addition, the pH of the medium is often lowered by the addition of acid.

Numerous additives to this basic type of solution have been studied, including certain growth retardants such as chlorocholine chloride and maleic hydrazide. The purpose of these growth retardants is to slow down the opening of the blossom in hopes of prolonging its life. In fact, the blossom is often retarded by such prior art methods to the point that the beauty of the blossom is diminished. The usual procedure for the use of these prior art solutions is simply to place the cut flowers in the solution for the duration of their decorative life.

A disadvantage of the above basic procedure is that it is often impractical to ship and store flowers while holding them in cans of nutrient solution. The retail florist or consumer often places the flowers in plain water, thereby shortening their potential decorative life.

The composition and process of the instant invention provides a treatment that can be carried out by the grower that greatly enhances the beauty and vase life of cut flowers. The composition and method are highly effective even if after the treatment the flowers are placed in tap water. Variations of the treatment, namely using solutions in the conventional manner, improves the beauty and vase life of the flowers more dramatically than any of the commercial preparations tested. By increasing the beauty, subjectively, the petals of the blossoms open more fully, are more symmetrical, and the petals are more turgid and suffer less "frilling" due to desiccation of their margins. This increase in beauty can be correlated, objectively, by the increase of blossom weight. The increase of flower weight correlates well with the aesthetic beauty.

Often flower growers like to store quantities of flowers for sale for special occasions, such as certain holidays where the display of flowers is traditional. Certain specific embodiments of this invention greatly enhance the beauty and life of the flower upon display after the bud has been subjected to prolonged cold storage after cutting. Some flowers, such as roses, are often cut as buds. Sometimes these buds, although apparently sufficiently mature, fail to open. This "frozen bud" phenomenon frequently occurs with glasshouse roses grown in the winter time, under less than optimum conditions. Treatment of roses in accordance with the invention reduces the occurrence of these frozen buds. Other problems with roses, such as "bent neck," in which the rose wilts just below the bud, and "flat face," where the profile of the blossom is thin, seem to occur because the flower fails to absorb sufficient aqueous solution. The invention enhances the absorption of the aqueous solution and therefore minimizes these problems. "Blueing," in which red roses take on a bluish cast with the onset of senility, is also postponed. Other flowers, such as gladioli and snapdragons suffer from "frozen buds." The invention reduces this occurrence with these flowers and also enhances their overall size and beauty.

BRIEF SUMMARY OF THE INVENTION

The invention provides a method for preserving a cut flower comprising contacting the cut flower with an aqueous solution containing an effective amount of a compound of the formula:

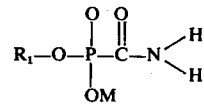

wherein $R_1$ represents an alkyl group of 1 to 4 carbon atoms or an alkenyl group of 3 or 4 carbon atoms, and M represents an ammonium or alkali metal ion;

for a sufficient time to substantially preserve and prolong retention of the natural appearance and enhance the beauty of the flower.

The process is particularly effective with roses, chrysanthemums, snapdragons and gladioli. Among the particularly preferred carbamoylphosphonates are ammonium ethyl carbamoylphosphonate and ammonium methyl carbamoylphosphonate. A preferred embodiment of the invention is one wherein the cut flower and the aqueous solution are maintained at a temperature within the range of just above the freezing point of water to about 10° centigrade above the freezing point of water to harden the cut flower.

Preferred solutions for practicing the method of this invention include solutions containing an effective amount of a nutrient sugar and more preferred solutions of the invention for specific applications also include systemic fungicides such as those selected from the group consisting of benomyl [methyl 1-(butylcarbamoyl)-2 benzimidazole carbamate], thiophanate [[Carbamic acid [1,2-phenylenebis (iminocarbonothioyl)] bis, diethyl ester]], thiophanate methyl [[Carbamic acid [1,2-phenylenebis (iminocarbonothioyl)] bis, dimethyl ester]], triforine [[Formamide, N,N'-[1,4-piperazinediylbis (2,2,2-trichloroethylidene)] bis]], or 2-methoxycarbonylaminobenzimidazole. It is preferred that the solution be maintained in an acidic state.

It is also desirable that the solution contain an effective amount of a bacteriostat such as those selected from the group consisting of 8-hydroxyquinoline, 8-hydroxyquinoline sulfate, benzoic acid, zinc 2-pyridinethione-1-oxide, or tribromosalicylanilide.

Also included within the scope of this invention are the above described compositions that are useful for practicing the method of this invention.

It is preferred that the carbamoylphosphonate be present in the aqueous solution in a concentration within the range of about 0.5 to about 50 grams per liter of water and that the aqueous solution contain an effective amount of a nutrient sugar.

DETAILED DESCRIPTION OF THE INVENTION

EXAMPLE I

Four solutions are prepared as indicated:
Solution A: Tap water, 100 cc.
Solution B: Tap water 100 cc., ammonium Ethyl carbamoylphosphonate 100 mg.
Solution C: A commercial flower preservative sold under the trademark "Roselife"*, 2 g, tap water 100 cc.
Solution D: "Roselife"*, 2 g, tap water 100 cc, ammonium ethyl carbamoylphosphonate 100 mg.

Five greenhouse grown roses, var. 'Forever Yours' are picked at full bud and the cut end placed in each solution. The solutions and roses are then refrigerated for 24 hours at 1°C. and then removed to room temperature and diffuse light. Daily the solutions are adjusted to 100 cc. by the addition of tap water. After 4 days at room temperature the following observations are made:

Solution A: roses past peak beauty, blossoms small, starting to blue and wilt.
Solution B and C: blossoms at or slightly beyond peak beauty, blossom size normal.
Solution D: blossoms at peak beauty, size, symmetry, and color much superior to the roses in Solutions A, B or C.

*A commercially available flower preservative sold under the trademark "Roselife", a product of Dux Rainbow, Inc., Broomfield, Colorado.

EXAMPLE 2

The following solutions are prepared:
Solution A: Tap water 1000 cc., "Roselife" (as identified in Example 1 ), 23 g.
Solution B: Sucrose 20 g., 8-hydroxyquinoline sulfate 1/2 g., Araboascorbic Acid 1/2 g., ammonium methyl carbamoylphosphate 2 g., Tap water 1000 cc.

Five roses each of five different varieties are picked at full bud, weighed, and placed in each solution. The solutions and roses contained in the vases are refrigerated overnight and then removed to room temperature for 4 days when most of the roses have reached their peak beauty. The roses are removed from the solution, blotted dry and weighed again. It is found that the roses in Solution A have gained 39 percent of their original weight and those in Solution B have gained 51 percent of their original weight. Aesthetically, those in Solution B are prettier and larger.

EXAMPLE 3

Substitution of sodium butyl carbamoylphosphonate for the ammonium methyl carbamoylphosphonate and a mixture of chrysanthemums and gladioli for the roses in Example 2 gives similar results. After several days the flowers in the solution corresponding to Solution B are heavier and prettier than those in Solution A and do not suffer from frozen buds.

EXAMPLE 4

The following solutions are prepared:
Solution A: A commercial flower preservative sold under the trademark "Everbloom"*, 30 g. dissolved in 1000 cc. tap water.
*Sold by W. Atlee Burpee Co., Philadelphia, Pa., The composition is as defined in U.S. Pat. No. 3,122,432.

Solution B: 28 g. sucrose, 1g. 8-hydroxyquinoline sulfate, 2 g. ammonium ethyl carbamoylphosphonate, tap water 1000 cc.

In each solution is placed the cut end of five roses var. 'Bridal Pink' freshly picked at full bud. The solutions containing the roses is refrigerated at 4°C. for 7 days and then removed to room temperature and diffuse light for 4 days. The roses in Solution B are fully opened and at peak beauty. Those in Solution A are also at their peak beauty but the blossoms are much smaller and most of the central petals fail to open.

EXAMPLE 5

The cut ends of long stem roses var. 'Golden Wave' freshly picked at full bud are placed in a solution of 50 g. sucrose, 1 g. araboascorbic acid, 0.5 g. 8-hydroxyquinoline and 5 g. ammonium ethyl carbamoylphosphonate all dissolved in 1000 cc. of tap water. The roses and solution are placed in a cold room at 2°C. for 24 hours. Then the roses are removed from the solution and graded. It is noted that each rose consumed an average of about 2 cc. of the hardening solution. When the roses are displayed the cut ends of the stems are placed in tap water. The roses last longer, and open more fully, and are more beautiful than those hardened in water or a competitive treatment. There is also a lower incidence of bentneck, flat face, and frozen buds in the flowers receiving the above treatment. This single liter of solution will treat hundreds of roses, therefore the cost to the grower is minimal.

EXAMPLE 6

The hardening solution of Example 5 is prepared. To this solution, 100 mg. of micropulverized 2-methoxycarbonylaminobenzimidazole is added. Roses of the variety 'Promise Me' are hardened for 24 hours at 4°C. in this mixture. During the subsequent grading, the roses are exposed to a light inoculum of botrytis cinerea. After 3 days storage in the above mixture, the roses are removed and placed in water. The unsightly lesions which develop on the blossom caused by the fungus, while not completely suppressed, are fewer and smaller than those on roses hardened in water or competitive treatments.

EXAMPLE 7

A solution is prepared of 1000 cc. water, 50 g. ammonium ethyl carbamoylphosphonate, 1 g. sodium n-lauryl sulfate. This is applied as a fine over all spray to rose buds during grading on a conveyer type grader. The roses receiving this treatment show greater size and beauty upon display than those that do not.

EXAMPLE 8

Glucose 50 kg, ammonium ethyl carbamoylphosphonate 1 kg, 8-hydroxyquinoline sulfate 0.5 kg, corn starch (anti-caking agent) 1 kg are blended, hammermilled and reblended. This furnishes a free flowing, noncaking, rapidly dissolving concentrate, suitable for preparing solutions for use in this invention.

Preparation of the carbamoylphosphonates that are useful in practicing this invention are well known in the art. British Pat. Specification No. 1,243,857, published Aug. 25, 1971, describes in detail the preparation of the carbamoylphosphonates.

In general, the invention is practiced by contacting a freshly harvested flower with the composition of this invention at a general concentration within the range of about 0.5 to about 50 grams per liter of the aqueous solution.

Contacting is meant to include sprays, dips, holding solutions, display solutions (including rigid foams impregnated with solutions), and expecially "hardening solutions." Hardening solutions are aqueous solutions in which the cut ends of the freshly cut flowers are placed. Then the flowers and solution are placed under refrigeration for a period of time to harden or become fully hydrated and turgid.

The compounds of this invention usually will be utilized as aqueous solutions. These aqueous solutions can contain various additives. For instance, if the material is utilized as a spray or dip it would be likely to contain nonphytotoxic sufactants, corrosion inhibiters, or emulsifiers. These additives are well known in the pesticide art. Hardening solutions, display solutions, and storage solutions would be likely to contain, in addition to the compound of Formula 1, materials known in the flower preservation art, such as nutrient sugars and a bacteriocide.

Additional additives would be likely to include anticaking agents, corrosion inhibitors and perhaps perfumes. Many flowers are subject to post-harvest diseases, particularly botrytis. This fungus infestation can be particularly damaging upon prolonged cold storage of the flowers. Therefore, it is advantageous to include in the compositions of this invention a systemic fungicide such as benomyl, thiophanate, thiophanate methyl, triforine, or 2-methoxycarbonylaminohenzimidazole which are effective in controlling these diseases.

As the formulations often contain sucrose, an agent such as quinine, or sucrose octaacetate might be added to make it unpalatable.

These additives, as well as the preferable concentration of active ingredient, will vary with the species of flower being treated as well as the season of the year. The preferable concentrations and method of application as well as other additives can be determined by trial by one experienced in the art of floraculture.

I claim:

1. A method for preserving and enhancing the beauty of a cut flower comprising contacting the cut flower with an aqueous solution containing an effective amount of a compound of the formula:

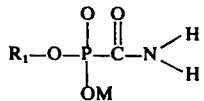

wherein $R_1$ represents an alkyl group of 1 to 4 carbon atoms or an alkenyl group of 3 to 4 carbon atoms, and M represents an ammonium or alkali metal ion;

for a sufficent time to substantially preserve and prolong retention of the natural appearance and enhance the beauty of the flower.

2. The process of claim 1 wherein the flowers are selected from the group consisting of roses, chrysanthemums, snapdragons and gladioli.

3. The method of claim 2 wherein the compound is ammonium ethyl carbamoylphosphonate.

4. The method of claim 2 wherein the compound is ammonium methyl carbamoylphosphonate.

5. The method of claim 1 wherein the cut flower is a rose and the compound is ammonium ethyl carbamoylphosphonate.

6. The method of claim 1 wherein the cut flower and the aqueous solution are maintained at a temperature within the range of just above the freezing point of water to about 10° centrigrade above the freezing point of water to harden the cut flower.

7. The method of claim 1 wherein the aqueous solution contains an effective amount of a nutrient sugar.

8. The method of claim 7 wherein the nutrient sugar is sucrose.

9. The method of claim 7 wherein the compound is present in a concentration within the range of about 0.5 to about 50 grams per liter of water.

10. The method of claim 7 wherein the cut flower is a rose and the compound is ammonium ethyl carbamoylphosphonate.

11. The method of claim 1 wherein the solution contains an effective amount of a systemic fungicide selected from the group consisting of benomyl, thiophanate, thiophanate methy, triforine, or 2-methoxycarbonylaminobenzimidazole.

12. The method of claim 11 wherein the fungicide is selected from the group consisting of benomyl, thiophanate, thiophanate methyl, triforine, or 2-methoxycarbonylaminobenzimidazole.

13. The method of claim 1 wherein the solution is maintained in an acidic state.

14. The method of claim 1 wherein the solution contains an effective amount of a systemic fungicide selected from the group consisting of benomyl, thiophanate, thiophanate methy, triforine, or 2-methoxycarbonylaminobenzimidazole, an effective amount of a nutrient sugar, and the solution is maintained in an acidic state.

15. The method of claim 1 wherein the solution contains an effective amount of a bacteriostat selected from the group consisting of 8-hydroxyquinoline, 8-hydroxyquinoline sulfate, zinc 2-pyridinethione-1-oxide or tribromosalicylanilide.

16. The method of claim 7 wherein the aqueous solution contains an effective amount of a bacteriostat selected from the group consisting of 8-hydroxyquinoline, 8-hydroxyquinoline sulfate, zinc 2-pyridinethione-1-oxide or tribromosalicylanilide.

17. The method as defined in claim 16 wherein the nutrient sugar is selected from the group consisting of sucrose and glucose.

18. The method as defined in claim 17 wherein the aqueous solution contains an effective amount of a systemic fungicide selected from the group consisting of benomyl, thiophanate, thiophanate methyl, triforine, or 2-methoxycarbonylaminobenzimidazole.

19. The method as defined in claim 17 wherein the aqueous solution contains an effective amount of a bacteriostat that is 8-hydroxyquinoline sulfate.

20. The method as defined in claim 19 wherein the compound is ammonium ethyl carbamoylphosphonate and the aqueous solution contains a nutrient sugar selected from the group consisting of glucose and sucrose.

21. The method as defined in claim 20 wherein the aqueous solution contains an effective amount of a systemic fungicide selected from the group consisting of benomyl, thiophanate, thiophanate methyl, triforine, or 2-methoxycarbonylaminobenzimidazole.

* * * * *